US009703791B2

(12) United States Patent
Blom et al.

(10) Patent No.: US 9,703,791 B2
(45) Date of Patent: Jul. 11, 2017

(54) METHOD AND APPARATUS FOR MANAGING FILES IN AN ONLINE ACCOUNT

(75) Inventors: Jan Blom, Lutry (CH); Divya Viswanathan, Chennai (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 685 days.

(21) Appl. No.: 13/634,544

(22) PCT Filed: Feb. 15, 2011

(86) PCT No.: PCT/FI2011/050135
§ 371 (c)(1),
(2), (4) Date: Dec. 6, 2012

(87) PCT Pub. No.: WO2011/117461
PCT Pub. Date: Sep. 29, 2011

(65) Prior Publication Data
US 2013/0212112 A1   Aug. 15, 2013

(30) Foreign Application Priority Data
Mar. 23, 2010  (IN) .............................. 772/CHE/2010

(51) Int. Cl.
G06F 7/00 (2006.01)
G06F 17/30 (2006.01)

(52) U.S. Cl.
CPC .............................. *G06F 17/30115* (2013.01)

(58) Field of Classification Search
CPC ...... G06F 7/00; G06F 17/30684; G06F 17/00; Y10S 707/99933
See application file for complete search history.

(56) References Cited

U.S. PATENT DOCUMENTS

| 2001/0054073 | A1* | 12/2001 | Ruppert et al. ............... 709/206 |
| 2003/0050933 | A1 | 3/2003 | DeSalvo |
| 2003/0191743 | A1* | 10/2003 | Brodersen et al. ............... 707/1 |
| 2004/0064733 | A1* | 4/2004 | Gong ............................ 713/201 |
| 2005/0060375 | A1 | 3/2005 | Ernest et al. |

(Continued)

FOREIGN PATENT DOCUMENTS

EP   0974917 A2   1/2000

OTHER PUBLICATIONS

International Search Report and Written Opinion received for corresponding International Patent Application No. PCT/FI2011/050135, dated Jun. 30, 2011, 15 pages.
Chinese Office Action for related Chinese Patent Application No. 201180015408.0 dated Feb. 28, 2015, with English-language summary, 12 pages.

(Continued)

*Primary Examiner* — Hosain Alam
*Assistant Examiner* — Nicholas Allen
(74) *Attorney, Agent, or Firm* — Ditthavong & Steiner, P.C.

(57) ABSTRACT

An approach is provided for managing files in an online account. A file access platform causes, at least in part, retrieval of a file associated with a first communication stored in an online account. Next, the file access platform determines whether the file is modified after the retrieval and generates a second communication including a modified version of the file based, at least in part, on the determination. Then, the file access platform causes, at least in part, transmission of the second communication including the modified version to the online account.

20 Claims, 12 Drawing Sheets

(56) References Cited

U.S. PATENT DOCUMENTS

| | | | |
|---|---|---|---|
| 2005/0076087 A1* | 4/2005 | Budd et al. | 709/206 |
| 2005/0108336 A1* | 5/2005 | Naick et al. | 709/206 |
| 2005/0283461 A1 | 12/2005 | Sell et al. | |
| 2006/0069990 A1 | 3/2006 | Yozell-Epstein et al. | |
| 2006/0075049 A1 | 4/2006 | Matsubara | |
| 2006/0085508 A1 | 4/2006 | Uchida et al. | |
| 2008/0168173 A1* | 7/2008 | Munje et al. | 709/228 |
| 2008/0189373 A1* | 8/2008 | Ikonen et al. | 709/206 |
| 2008/0320103 A1* | 12/2008 | Martin et al. | 709/219 |
| 2009/0030872 A1* | 1/2009 | Brezina et al. | 707/1 |
| 2009/0112992 A1* | 4/2009 | Arcand | 709/205 |
| 2009/0187852 A1* | 7/2009 | Tsuruta | 715/800 |
| 2009/0258662 A1* | 10/2009 | Rybak et al. | 455/466 |
| 2009/0282463 A1* | 11/2009 | McIsaac et al. | 726/4 |
| 2009/0292930 A1* | 11/2009 | Marano et al. | 713/189 |
| 2010/0017404 A1* | 1/2010 | Banerjee et al. | 707/6 |
| 2011/0087958 A1* | 4/2011 | Dumitru et al. | 715/234 |
| 2012/0124143 A1* | 5/2012 | Chung et al. | 709/206 |
| 2012/0151379 A1* | 6/2012 | Schultz et al. | 715/752 |

OTHER PUBLICATIONS

Office Action for corresponding Chinese Patent Application No. 201180015408.0, dated Mar. 1, 2016, with English-language summary, 7 Pages.

Chinese Office Action for related Chinese Patent Application No. 201180015408.0 dated Sep. 15, 2015, with English-language summary, 12 Pages.

Office Action for corresponding Indian Patent Application No. 772/CHE/2010, dated Feb. 6, 2017, 12 pages.

\* cited by examiner

METHOD AND APPARATUS FOR MANAGING FILES IN AN ONLINE ACCOUNT

RELATED APPLICATION

This application was originally filed as PCT Application No. PCT/FI2011/050135 filed Feb. 15, 2011 which claims priority benefit to Indian Patent Application No. 772/CHE/2010, filed Mar. 23, 2010.

BACKGROUND

Service providers and device manufacturers (e.g., wireless, cellular, etc.) are continually challenged to deliver value and convenience to consumers by, for example, providing compelling network services. One area of interest has been the development of online or web-based e-mail services, particularly those available for free (e.g., Yahoo! Mail, Google Mail, Microsoft's Hotmail, etc.). It is noted that these web-based e-mails services have gained great popularity among users and can provide considerable amounts of storage space (e.g., typically several gigabytes or more per account) for user e-mails and related attachments. Because of this available storage space, it is further noted that users often repurpose such e-mail services as online document or file repositories. For example, a user may email documents to himself or herself for storage and subsequent retrieval. However, because these services were not designed for use as document repositories, they generally do not provide tools for easily managing files that have been, for instance, sent as attachments to emails in the services for storage. Accordingly, service providers and device manufacturers face significant technical challenges to facilitating use of online communication accounts such as web-based e-mail services for file storage.

SOME EXAMPLE EMBODIMENTS

Therefore, there is a need for an approach for efficiently managing files stored in online accounts (e.g., web-based e-mail accounts).

According to one embodiment, a method comprises causing, at least in part, retrieval of a file associated with a first communication stored in an online account. The method also comprises determining whether the file is modified after the retrieval. The method further comprises generating a second communication including a modified version of the file based, at least in part, on the determination. The method further comprises causing, at least in part, transmission of the second communication including the modified version to the online account.

According to another embodiment, an apparatus comprising at least one processor, and at least one memory including computer program code, the at least one memory and the computer program code configured to, with the at least one processor, cause, at least in part, the apparatus to cause, at least in part, retrieval of a file associated with a first communication stored in an online account. The apparatus is also caused to determine whether the file is modified after the retrieval. The apparatus is further caused to generate a second communication including a modified version of the file based, at least in part, on the determination. The apparatus is further caused to cause, at least in part, transmission of the second communication including the modified version to the online account.

According to another embodiment, a computer-readable storage medium carrying one or more sequences of one or more instructions which, when executed by one or more processors, cause, at least in part, an apparatus to cause, at least in part, retrieval of a file associated with a first communication stored in an online account. The apparatus is also caused to determine whether the file is modified after the retrieval. The apparatus is further caused to generate a second communication including a modified version of the file based, at least in part, on the determination. The apparatus is further caused to cause, at least in part, transmission of the second communication including the modified version to the online account.

According to another embodiment, an apparatus comprises means for causing, at least in part, retrieval of a file associated with a first communication stored in an online account. The apparatus also comprises means for determining whether the file is modified after the retrieval. The apparatus further comprises means for generating a second communication including a modified version of the file based, at least in part, on the determination. The apparatus further comprises means for causing, at least in part, transmission of the second communication including the modified version to the online account.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for managing files in an online account are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
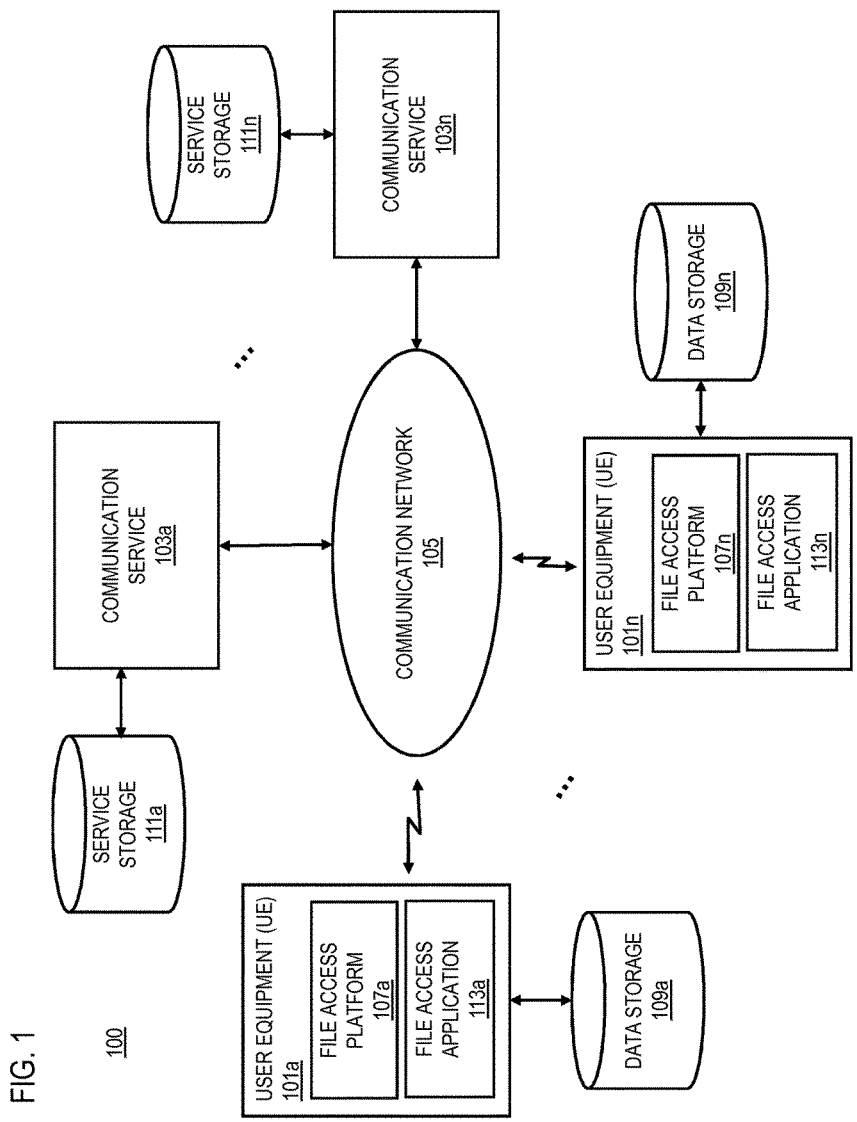
FIG. 1 is a diagram of a system capable of managing files in an online account, according to one embodiment.

FIG. 1 is a diagram of a system capable of managing files in an online account, according to one embodiment. As discussed previously, there has been increasing use of electronic communication services (e.g., online e-mail accounts) as file repositories or storage. By way of example, such reuse of the communication service or online account can be achieved by including a file or other electronic data within a communication message (e.g., as an attachment), thereby storing the file or data in the network storage of the provider of the online account. In this way, the file or other data exists in the network infrastructure of the service provider, where the file can be easily accessed by the account owner using, for instance, any device with access to the communication service. Moreover, storing the data in the network storage allows a user to avoid having to rely on a personal device or a personal storage unit to store and access the data. This is useful for the users of devices with a limited storage space because the data can be stored in the network storage instead of the local device itself.

However, it is noted that after storage of the data in the online account, a user may want to modify or access the electronic data using an application present in a user's local device. For example, a restaurant manager who want to update his customer list that has been stored as an attachment in a web-based email system, or a medical representative who maintain inventory files that are similarly stored in an online account may desire to continuously modify the files using a mobile device having a relatively small amount of storage space. However, this data can be cumbersome to access. For example, if the electronic data is stored within an electronic communication (e.g., e-mail message) of an online account, the electronic data generally needs to be retrieved from the electronic communication and then transferred to the user's local device. However, any modifications that the user may make to the retrieved electronic data while resident in the user's local device would not be reflected in the online account without manual user intervention (e.g., manually storing the modified file in the online account).

It is noted that conventional approaches to web-based document management generally require users to also edit their documents online By way of example, Google Docs is an online service that allows editing and saving documents using a web-based application. However, there is no direct interaction with native applications on the user's device from the Google Docs web-based application. As a result, when the local device can provide a more desirable or powerful application to make modifications on the files, the user is likely to download the electronic file and access it locally rather than using Google Docs. In this case, Google Docs does not have a capability to account for modifications made in the user's local device, so as to synchronize between the local device and the network account when modifications are made to the file downloaded to the local device.

To address this problem, a system 100 of FIG. 1 introduces the capability to keep track of a file retrieved to a local device from an online account, and to automatically transmit a modified version of the file, if the file is modified, to the online account for storage. More specifically, the system 100 retrieves a file associated with a communication stored in an account, and if the file is modified in the local device, then transmits the modified version of the file from the local device to the online account, via another communication including the modified version. For example, a user may look at an electronic communication with an online account such as an e-mail, and if there is a file attached to the email, the user may want to download a file included in the e-mail to the local device. Then, the user may want to edit and make modifications to the file downloaded to the local device. If the modifications are made to the downloaded file at the local device, then the modified version of the downloaded file can be sent to the same e-mail account as an attachment to another e-mail, thus synchronizing the file between the local device and the e-mail account. In one embodiment, the e-mail including the modified version of the downloaded file may be associated with the same e-mail thread as the e-mail from which the file is initially downloaded, in order to keep the similar files together. In another embodiment, storage of the multiple versions of a file can be easily maintained in the e-mail message thread in a chronological order (e.g., based on the e-mail dates) to quickly identify the latest version of the file.

In one embodiment, the UE 101 may maintain a list or index of files stored within an online account of the user (i.e. communication service 103). For example, in the approach described herein, the UE 101 may periodically search or scan the online account for new messages and update the list according. In one example, the UE 101 may detect when new electronic communications that include, for instance, attached files or data are received at the online account and then catalog the file in the list or index. Then, the UE 101 shows the list of the files, from which the user can select a file to access using the UE 101. When the file is selected, the file is downloaded to the UE 101 and opened using a file access application 113 in the UE 101. If modifications are made to the file downloaded to the UE 101, then the UE 101 may send (e.g., automatically send) another communication back to the online account with the modified version, so that the modified version is included in the online account. In one example, the UE 101 may send the modified version as an attachment to a reply communication to the communication where the file was initially downloaded, such that the files are kept within a common communication thread.

In another embodiment, when a file is downloaded from the online account to the UE 101, information about the online account may be automatically added to the file. By way of example, this information may be incorporated into the metadata of the file. Then, when the file is accessed and modified using the file access application 113, the file access application 113 may enable synchronization between a local device (i.e. UE 101) and an online account (i.e. communication service 103), based on the information about the online account added to the file. For example, the file access application 113 may provide an option that can be selected by a user to generate a communication including a modified version of the file to be transmitted to the online account.

Therefore, an advantage of this approach herein is that the UE 101 keeps a track of modifications made to the files retrieved from an online account such that the modified version may also be kept in the online account. Another advantage may be that this approach can help organize files in the online account by placing an unmodified file and a modified version of the file within a same communication thread. Therefore, means for managing and/or synchronizing local files originated from an online account is anticipated.

As shown in FIG. 1, the system 100 comprises a user equipment (UE) 101 having connectivity to other UEs 101 and/or a communication service 103, via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UEs 101a-101n and the communication services 103a-103n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
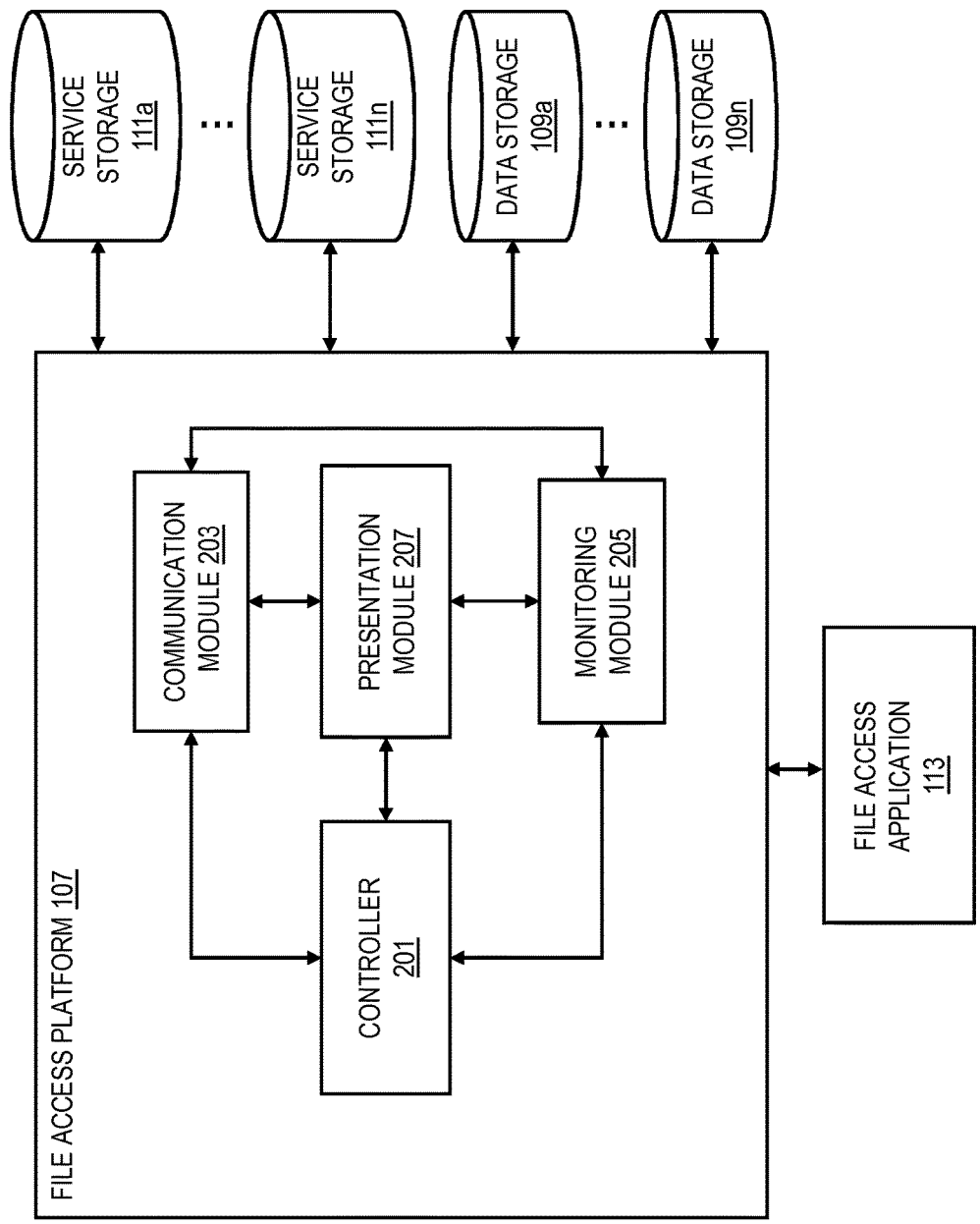
FIG. 2 is a diagram of the components of the file access platform, according to one embodiment.

FIG. 2 is a diagram of the components of a file access platform 107, according to one embodiment. By way of example, the file access platform 107 includes one or more components for managing files in an online account. It is contemplated that the functions of these components may be combined in one or more components or performed by other components of equivalent functionality. In this embodiment, the file access platform 107 includes a controller 201, a communication module 203, a monitoring module 205 and a presentation module 207. The controller 201 oversees tasks, including tasks performed by the communication module 203, the monitoring module 205 and the presentation module 207. The communication module 203 handles any incoming or outgoing communication in the UE 101, including downloading from or uploading to the service storage 111 and/or the data storage 109 of other UEs 101a-101n. The communication may be an e-mail communication, communication involving forums, discussion groups, or any other electronic messages in which data or files may be attached, embedded, or otherwise associated. In one embodiment, the communication may also support threaded communications in which individual messages may be associated according to subject, keywords, and the like. For example, the communication module 203 may retrieve a file associated with a first communication stored in the service storage 111, wherein the file associated with the first communication may be a file attached to an e-mail message (i.e., the service storage 111 being the storage for an e-mail communication service). The retrieved file may be accessed by a file access application 113 (e.g., a word processing application if the file is a text document, a photo processing if the file is an image file, etc.), which may provide tools to make modifications to the retrieved file. The monitoring module 205 monitors the status of the retrieved file and determines whether the retrieved file is modified. If modifications have been made to the retrieved file, then the monitoring module 205 may direct the communication module 203 to generate a second communication including a modified version of the file, and transmit it to the service storage 111. The second communication including the modified version may be another e-mail message with the modified version of the file attached to the e-mail. The first and second communications may be associated with a common threaded communication, such that the file and the modified version of the file can be organized within the same thread. Further, the presentation module 207 controls display of a user interface such as graphical user interface, to convey information and to enable the user to interact with the UE 101 via the interface. More specifically, the presentation module 207 may provide a user interface to enable the user to retrieve files or upload the files, as well as to provide a way to access the files.

In one embodiment, the monitoring module 205 may also monitor all other communications involving the communication service 103 (as well as the service storage 111), and finds communications with files attached to the communications. Then, the monitoring module 205 may compile an index of these files. This task may be performed periodically, updating the compiled index of the files. Then, the presentation module 207 may show a list of the files stored in the service storage 111 so that a user can select a file from the list.

In another embodiment, when a communication including a file is retrieved from the service storage 111, metadata may be added to the retrieved file associated with a communication, wherein the metadata includes information about the account with the communication service 103. The metadata may be added by the monitoring module 205 or the communication service 103, as the file is retrieved. Then, if a modified version of the file is to be transmitted to the communication service 103, the communication conveying the modified version is transmitted based on the metadata. For example, the metadata may identify the online account and/or communication thread from which the file originated. In one embodiment, the metadata may also specify authentication credentials (e.g., username and password, authentication token, etc.) for accessing or communicating via the online account. In this way, the file access application 113 may be determine whether metadata linking the file to an online account exists. If such metadata exists, then the file access application 113 may automatically synchronize or initiate storage of the file when, for instance, the user opts to save or otherwise store the file associated with the described metadata. In another embodiment, the file access application 113 may include a manual option to enable synchronization of the file between the UE 101 and the communication service 103. When the synchronization option is selected, the file access application 113 requests the communication module 203 to generate and to transmit, according to the metadata, the second communication with the modified version of the file attached to the second communication.

Additionally, the files may be accessed by multiple users, depending on the conditions set by a user. For example, a user who is also an owner of the account (e.g., web-based e-mail account) in the communication service 103 in which a particular file is stored may define whether the file will be for access exclusively by the owner or whether the file will be available to other authorized users as well. If the file is for exclusive access by the owner, then other users may not be able to retrieve the file from the user's account in the communication service 103. Otherwise, other users may be able to retrieve the file from the user's account, and make modifications and send the modified version to the user's account. In one embodiment, access may be controlled via, for instance, authentication credentials associated with the communication service 103. Depending on the capabilities for the communication service 103, the authentication credentials may be a common set of credentials shared among multiple users of the account or may be individual credentials specific to each user.

Figure 3:
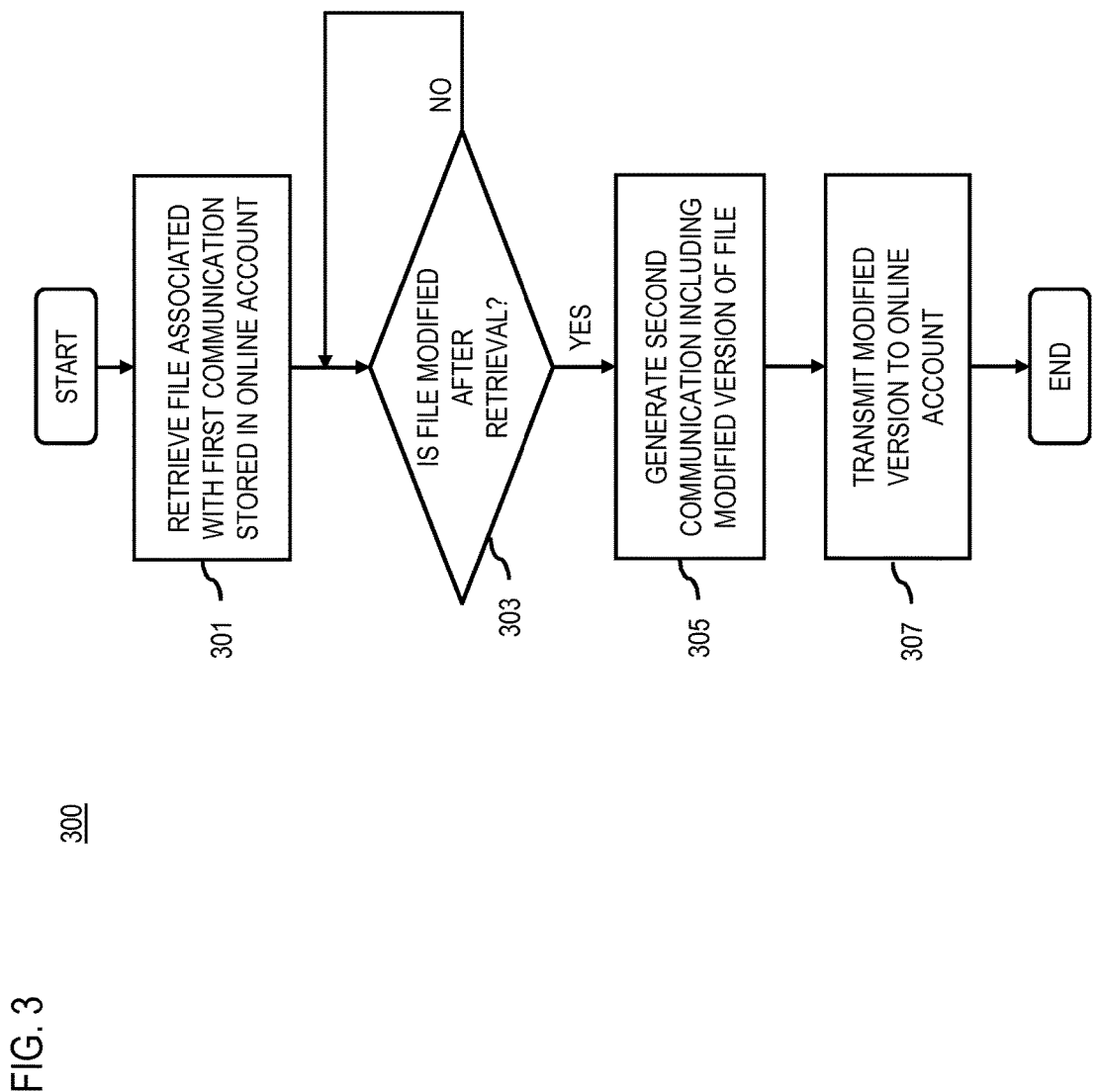
FIG. 3 is a flowchart of a process for managing files in an online account, according to one embodiment.

FIG. 3 is a flowchart of a process for managing files in an online account, according to one embodiment. In one embodiment, the file access platform performs the process 300 and is implemented in, for instance, a chip set including a processor and a memory as shown FIG. 10. In step 301, the file access platform 107 retrieves a file associated with the first communication stored in an online account (e.g. an account with a communication service 103). In one embodiment, the first communication in the online account may be accessed by submitting authentication information for the online account. By way of example, the first communication may be an e-mail communication from a user's e-mail account, wherein the email includes a file as an attachment. Then, the e-mail message with the attached file may be accessed and retrieved after submitting a user id and a corresponding password as a form of authentication. In step 303, the file access platform 303 determines whether the retrieved file is modified after the retrieval. As described previously, the retrieved file may be accessed and modified by the file access application 113. The file access application 113 may be present in the UE 101, and the UE 101 may include multiple applications to access and modify different types of files. As examples of file access applications 113, the UE 101 may include Microsoft Word to access Word documents, Adobe Acrobat to access Portable Document Format (PDF) files, Adobe Photoshop to access JPEG files, etc. If the retrieved file is modified, then the file access platform 107 generates a second communication including a modified version of the file (e.g., as an attachment to the second communication), as shown in step 305. Then, in step 307, the file access platform 107 transmits the modified version of the file to the online account. For example, the file access platform 107 may generate an e-mail message with the modified version of the file as an attachment to be transmitted to the user's e-mail account. The second communication transmitted to the online account may be placed in the common thread as the first communication. In one example, when the file access platform 107 generates the second communication, the file access platform 107 may use the same or similar subject line as the first communication's subject line, such that the online account can place the first and second communications in the common thread based on the subject line. If the file has not been modified after the retrieval and thus there is no modified version of the file, the file access platform 303 need not send the file back to the account.

In one embodiment, multiple modified versions may be transmitted to the online account, as the retrieved file continues to be modified. In this embodiment, the file access platform 107 will keep track of the most recently modified version and a predetermined number of previously modified versions. In one example, the file access platform 107 may save within the UE 101 only the most recently modified version and a modified version immediately prior thereto, although all modified versions may be transmitted to the online account. The file access platform 107 may also be configured to keep the most recently modified version within the UE 101, but to delete other previously modified versions, after transmission to the online account. Further, at the UE 101, the file access platform 107 may mainly show the most recently modified version, but may also have other modified versions available in a hidden window.

This process is advantageous in that it provides a user of the UE 101a way to keep track of the file retrieved from the online account and modified in the UE 101 by storing the modified version of the file in the online account. Thus, this process enhances the user experience in using the storage provided by the online account by, for instance, reducing the burden of having to manually store the file and any of its modified forms in the online account. The file access platform 107 is a means for achieving this advantage.

Figure 4:
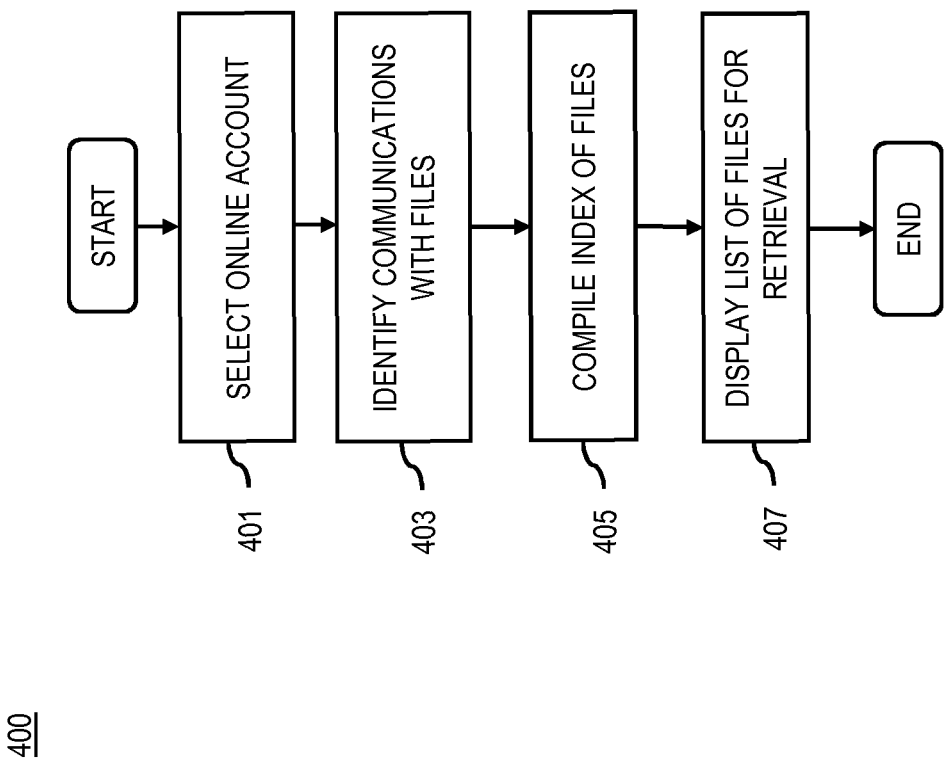
FIG. 4 is a flowchart of a process for maintaining a list of files for retrieval from an online account, according to one embodiment.

FIG. 4 is a flowchart of a process for maintaining a list of files for retrieval from an online account, according to one embodiment. In one embodiment, the file access platform 107 performs the process 400 and is implemented in, for instance, a chip set including a processor and a memory as shown FIG. 10. FIG. 4 reflects the features of a structured synchronization, wherein a user interface or an application independent from the file access application 113 is used to maintain the files in the online account and to perform synchronization. In step 401, an online account (e.g., an account with a communication service 103) is selected. The file access platform 107 may provide a user interface to select from different online accounts of various communication services 103a-103n. For example, the file access platform 107 may enable a user to select from communication services including e-mail communication services such as Ovi Mail, Gmail, Hotmail, Yahoo Mail as well as any other forums or messaging services. Then, in step 403, the file access platform 107 identifies communications including files stored within the selected online account (e.g., file attached to communication messages). In step 405, the file access platform 107 compiles an index of the identified files in the selected online account. This index of the identified files may be periodically updated to maintain an up-to-date list of files stored in the selected online account. In step 407, the file access platform 107 may display a list of files stored in the selected online account such that a user may select from the list a file to retrieve. When the file is retrieved, a process similar to the process 300 may be performed by the file access platform 107. However, in an embodiment of structured synchronization, the file access platform 107 collects and utilizes information (e.g., account information stored as metadata associated with the file) to generate and transmit the second communication to the online account for subsequent storage of a modified file.

This process is advantageous in that it enables a user of the UE 101 to maintain files stored in different online accounts, and provides an easy way to retrieve files from the user's online accounts. The file access platform 107 is a means for achieving this advantage.

Figure 5:
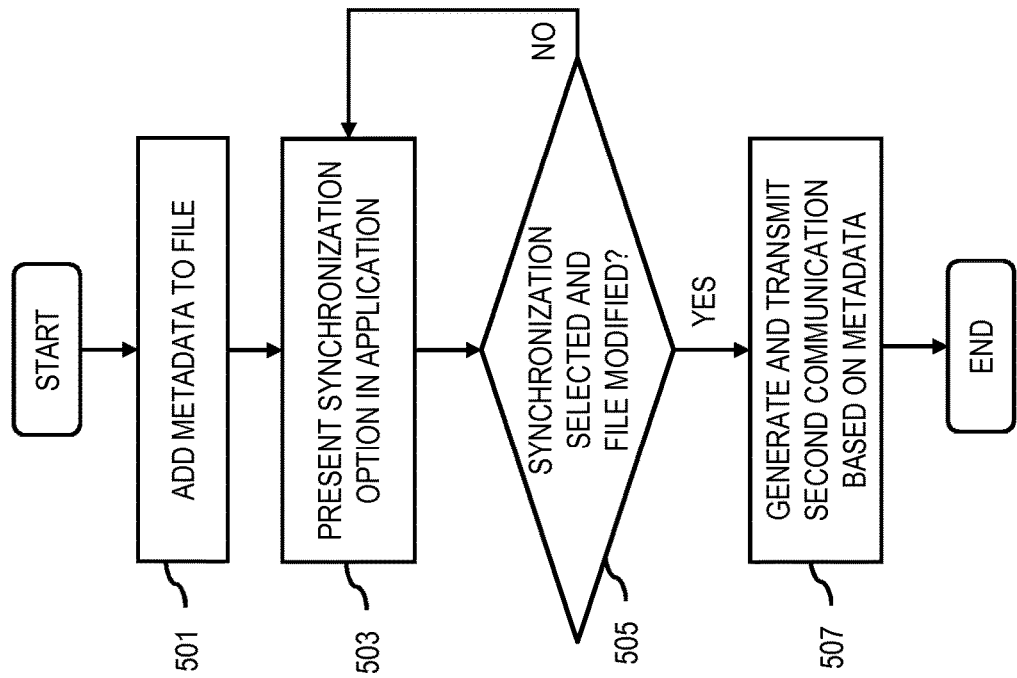
FIG. 5 is a flowchart of a process for utilizing metadata in updating a file managed in an online account, according to one embodiment.

FIG. 5 is a flowchart of a process for updating a file managed in an online account, according to one embodiment. In one embodiment, the file access platform 107 and/or the file access application 113 perform the process 500 and is implemented in, for instance, a chip set including a processor and a memory as shown FIG. 10. FIG. 5 reflects the features of an embedded synchronization, wherein the file access application 113 has synchronization features embedded in the file access application 103. As a file included in a communication (e.g., e-mail) is retrieved from an online account, metadata may be added to the file, as shown in step 501. The metadata may be added by the communication service 103 for the online account as the file is requested for retrieval. Alternatively, the metadata may be added by the file access platform 107. As noted above, the metadata may include information regarding the online account. For example, if the online account is for an e-mail, the metadata may include an e-mail address associated with the online account, a user name and a password and a subject line of the e-mail from which the file originates. Thus, as the user attempts to download a file in an e-mail message and to open it using the file access application 113, the metadata may be added to the file. Then, the file access application 113 presents synchronization options as a part of the file access application 113, as shown in step 503. In step 505, the file access application 113 determines whether the synchronization is selected and the retrieved file is modified. Alternatively, the file access platform 107 may determine whether the retrieved file is modified. If the synchronization is selected and the retrieved file is modified, then the file access application 113 requests the file access platform 107 to generate and transmit to the online account the second communication including the modified version of the file, according to the information in the metadata. Therefore, according to this embodiment, the file access application 113 may handle much of the synchronization or file management process associated with the online account. Alternatively, the file access application 113 may be designed to be able to generate the second communication including the modified version of the file without assistance from the file access platform 107.

This process is advantageous in that it enables a user of the UE 101 to perform synchronization within the file access application 113, without relying on a separate application. The file access application 113 and the file access platform 107 are means for achieving this advantage.

Figure 6:
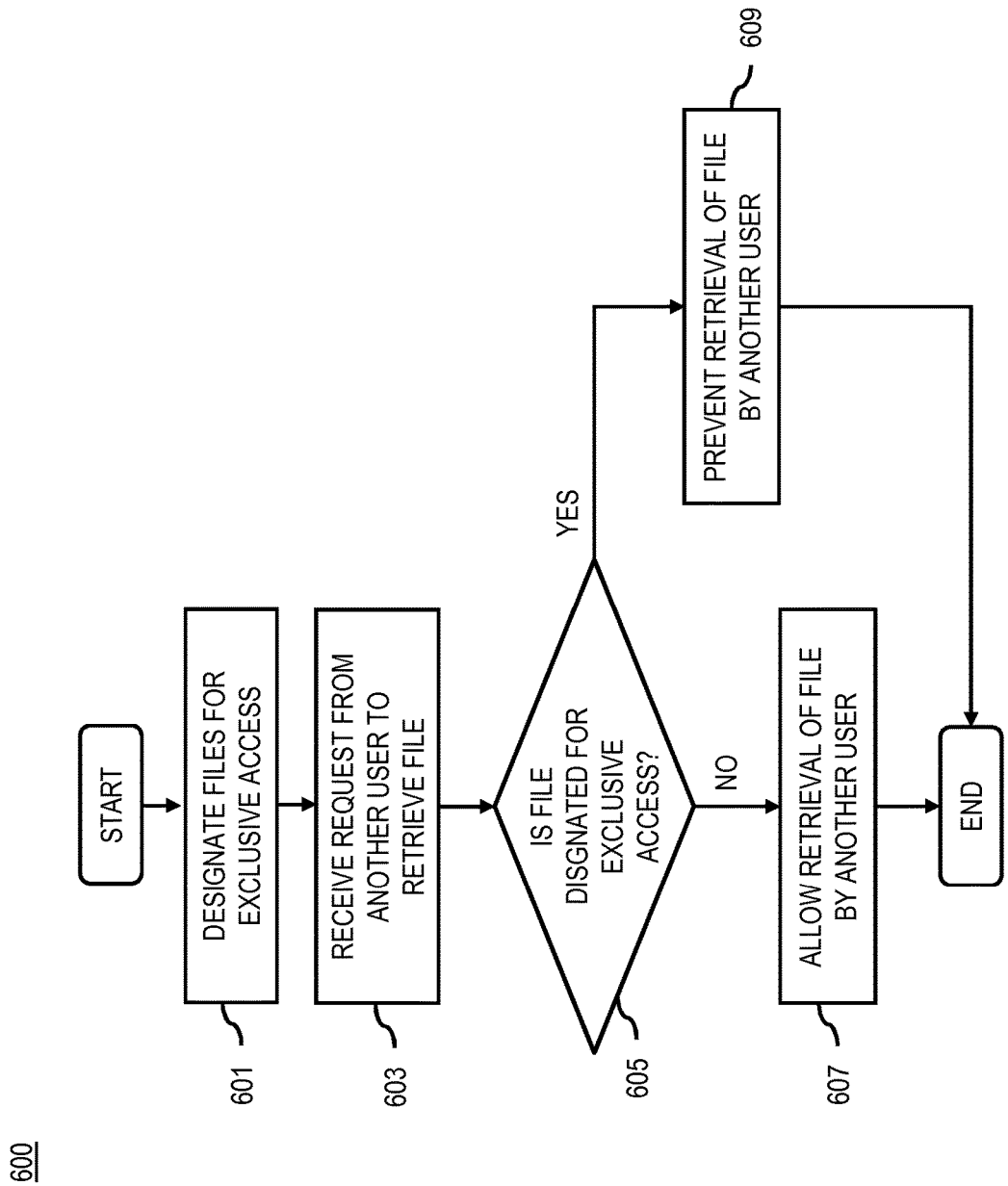
FIG. 6 is a flowchart of a process for managing access to files in an online account, according to one embodiment.

FIG. 6 is a flowchart of a process for managing access to files in an online account, according to one embodiment. In one embodiment, the file access platform 107 performs the process 600 and is implemented in, for instance, a chip set including a processor and a memory as shown FIG. 10. In step 601, the user of the UE 101 designates files in the user's communication service account for exclusive access. Then, the files designated for exclusive access in the user's account can be accessed only by the user of the user's account. When a request from another user is received to retrieve a file, as shown in step 603, the file access platform 107 determines whether the requested file is designated for exclusive access, as shown in step 605. If the file is designated for exclusive access, then the file access platform 107 prevents another user from retrieving the requested file from the user's account, as shown in step 609. For example, the file access platform 107 may return an error message and not provide the requested file. On the contrary, if the file is not designated for exclusive access, then the file may be retrieved by another user, as shown in step 607. Then, the other user may be able to modify the file and have the file access platform 107 transmit the modified version to the online account, according to the process 300 disclosed in FIG. 3. Thus, multiple users may be access and modify the file, if the file is not designated for exclusive access, and the modified versions may be transmitted to the user's online account and kept under a common communication thread. In certain embodiments, the file access platform 107 may track when a user has retrieved a particular and will grant exclusive access to that particular until the user initiates storage of a modified version of the file or otherwise indicates that the user is no longer actively editing the file. Then, the file access platform 107 can make the file available to other users. In this way, the file access platform 107 ensures that only one user can make and save modifications to the file at any one time.

This process is advantageous in that it enables multiple users to access and modify a single file, depending on its exclusive access setting. The file access platform 107 is a means for achieving this advantage.

Although not shown in the figures, the access permission may also be determined based on the users. The owner or other authorized user of the online communication account may designate other users who are allowed to access the files from the user's account. In addition, the owner of the account may also designate a group that is allowed to access files in the account, such that other users who have joined the group are allowed to access the files. In this case, when modifications are made to the file, then the modified version of the file may be placed in a common communication thread, even if modifications are made by different users. Further, although not shown in the figures, the user may configure the file access platform 107 such that the modified version of the retrieved file is transmitted to a different online account. For example, the file access platform 107 may be configured such that, if the file retrieved from a Gmail account, the modified version of the file is transmitted to a Hotmail account.

Figure 7B:
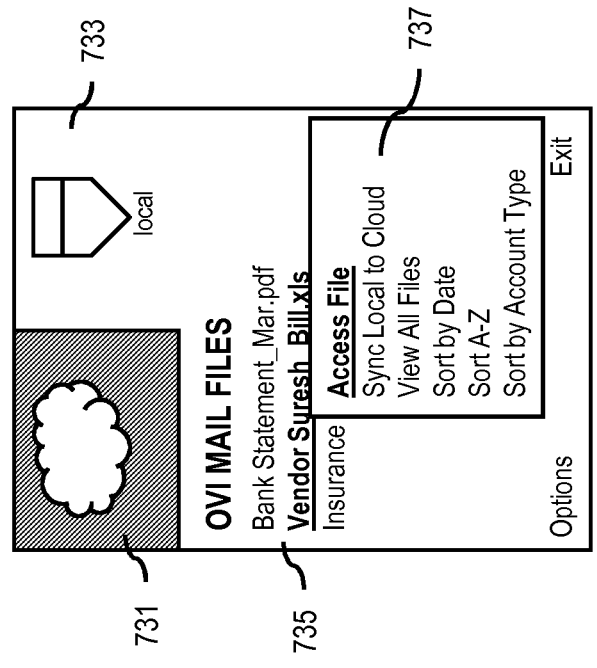
FIGS. 7A-7D are diagrams of user interfaces utilized in the processes of FIG. 3, according to one embodiment.
Figure 7A:
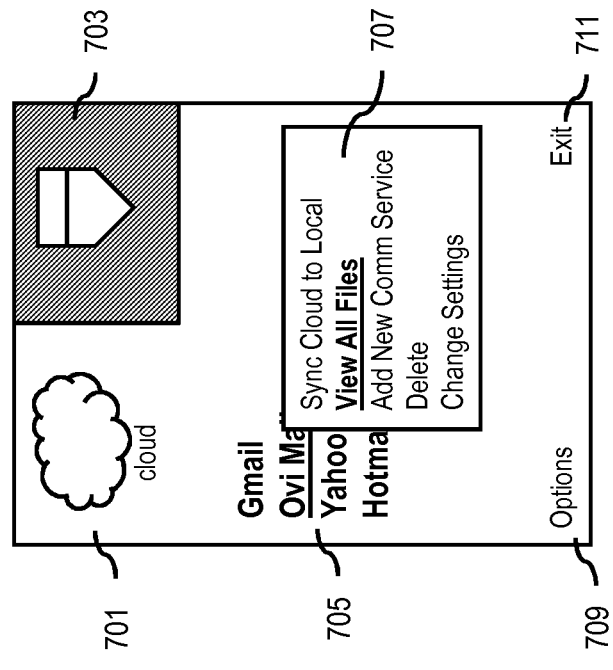

FIGS. 7A-7D are diagrams of user interfaces utilized in the processes of FIGS. 3 and 4, according to one embodiment. FIGS. 7A-7D show at least the features of the structured synchronization, wherein the Cloud-to-Local application is used to access the files in the online account and perform synchronization. FIG. 7A shows a cloud interface 700 of the Cloud-to-Local application displaying tabs for two sources of data, a cloud tab 701 and a local tab 703. The cloud stands for user accounts for various communication services 103a-103n and the local stands for a local device such as the UE 101. Thus, as shown in FIG. 7A, when the cloud tab is selected 701, the cloud interface 700 displays a communication service list 705 that the user may access via the cloud interface 700. In this example, the communication service list 705 includes Ovi Mail, Gmail, Yahoo and Hotmail services. The user may scroll up and down to select the desired communication service. In this example, Gmail service is selected, as shown by an underline. When a communication service is selected, the service window 707 appears to display various options for the selected communication service. The options in the service window 707 include "Sync Cloud to Local" to retrieve file from the communication services and the local device and "View All files" to enable viewing of all files stored in the selected communication service account. The options in the service window 707 further includes "Add New Comm Service" option to add a new communication service, in addition to the communication services listed on the communication service list 705, "Delete" option to delete the selected communication service from the communication service list 705. The options in the service window 707 also includes "Change Settings" option to changes setting for the selected communication service, wherein the settings may include a user id and a password as well as settings for a privacy or exclusive access that may prohibit access by other users. The options button 709 may provide any other available options, such as user preferences or system configuration settings.

FIG. 7B shows a local interface 730 showing a list of files stored under an Ovi Mail account. In FIG. 7B, the cloud tab 731 is not selected, but the local tab 733 is selected. With the local tab 733 selected, the local interface 730 shows a file list 735 for a corresponding communication service. In this example, the file list 735 shows a list of files stored in the Ovi Mail account. The user can scroll up and down to select a desired file, wherein the selected file is indicated by an underline. In this example, the file "Vendor Suresh Bill.xls" is selected, and with the selection, the file selection window 737 is displayed. The file selection window 737 may include an "Access File" option to access the selected file, a "Sync Local to Cloud" option to generate an e-mail message including a modified version of the selected file and to transmit to the selected communication service account (i.e. Ovi Mail account, in this example). The file selection window 737 may also include a "View All Files" option to enable viewing of all files stored in the selected communication service account. Further, the file selection window 737 may include options to sort the files based on different criteria, including date, alphabetical order and account type.

Figure 7D:
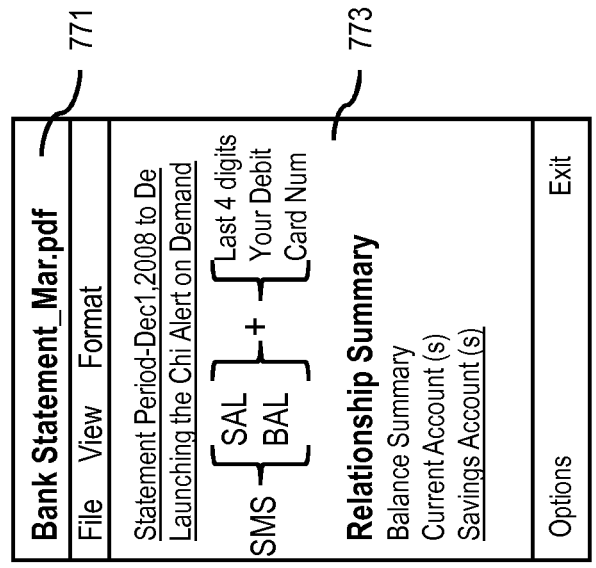
Figure 7C:
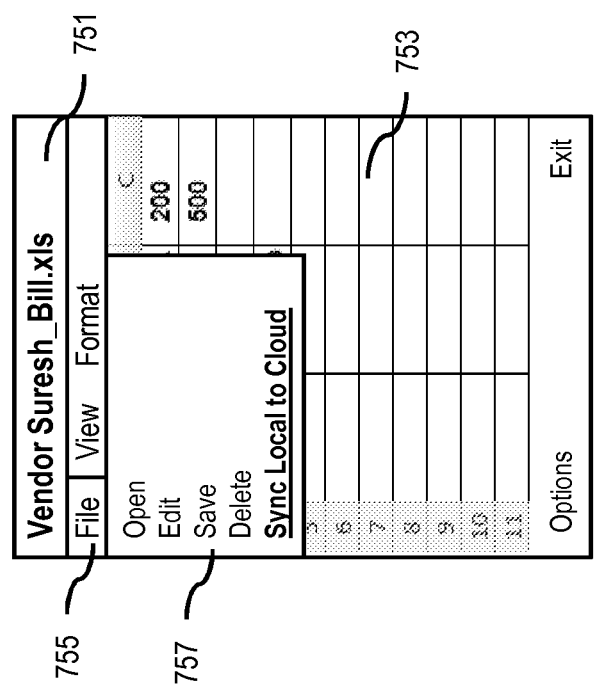

FIG. 7C shows a display of a spread sheet file 750, when a user accesses a file retrieved to the local device (i.e. UE 1010). The name of the file is displayed on the title panel 751. The spread sheet 753 may be displayed using an access application 113, which also provides a file option 755, among other options. When the file option 755 is selected, a file window 757 is displayed. The file window 757 may include options including "Open" to open a new file, "Edit" to edit a current file, "Save" to save the current file and "Delete" to delete the current file. The file window 757 may also include an option "Save Local to Cloud" to generate a communication including a modified version of the selected file (i.e. Vendor Suresh_Bill.xls, in this example) and to transmit to the selected communication service account. As another example, FIG. 7D shows a display of a PDF file 770 when a user accesses a file retrieved to the local device. The name of the file is displayed on the title panel 771 and the content is shown in the main window 773.

Figure 8:
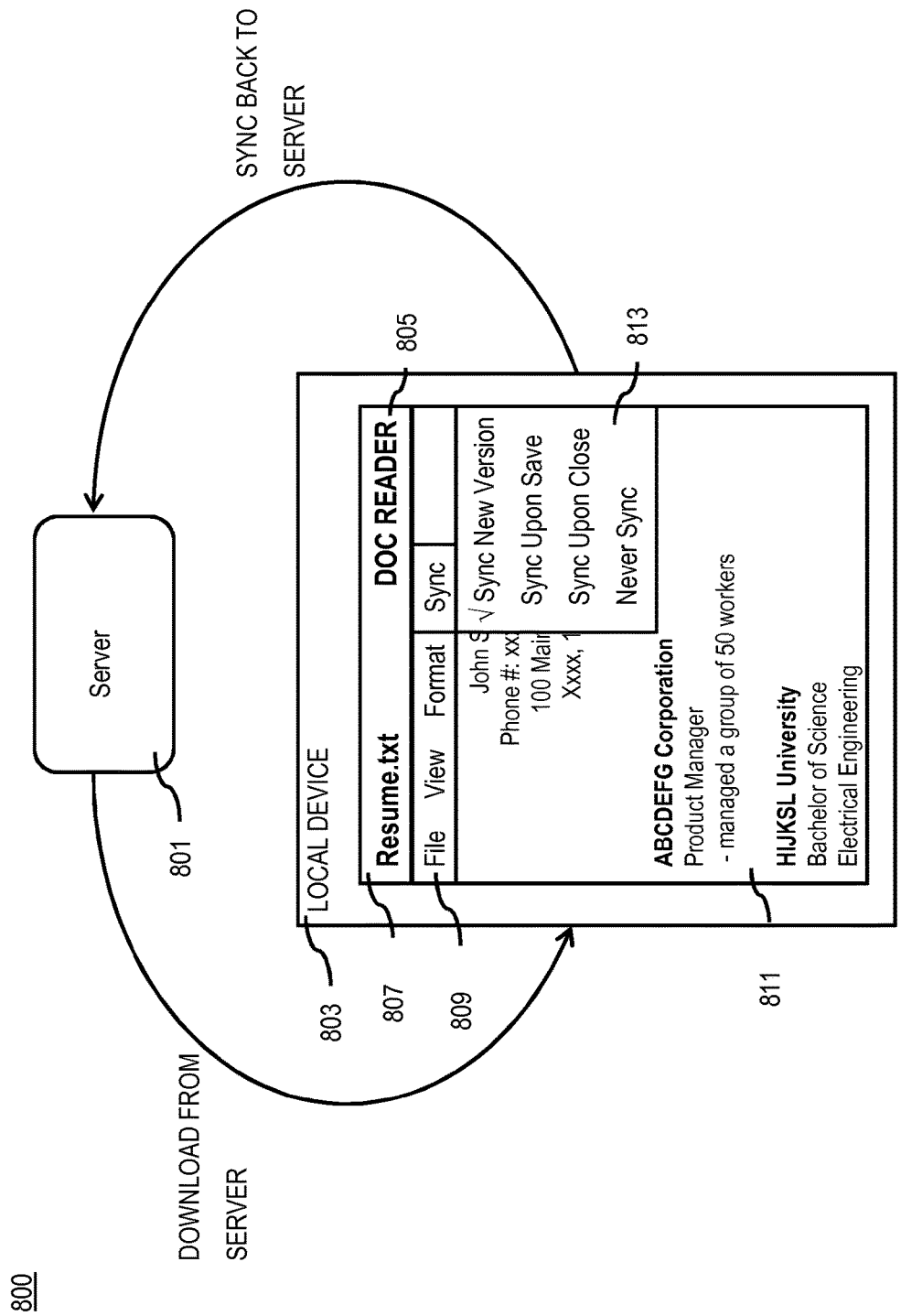
FIG. 8 is a diagram of user interfaces utilized in the processes of FIG. 3, according to another embodiment.

FIG. 8 is a diagram of a user interface in the UE 101 and a communication between a server and the user interface, utilized in the processes of FIGS. 3 and 5, according to another embodiment. FIG. 8 shows at least the features of the embedded synchronization shown in FIG. 5. As a file included in an e-mail as an attachment is downloaded from the e-mail server 801 (e.g. communication service 103) to a local device 803 (e.g. UE 101), a metadata is added to the file. The metadata may be added by the server 801 before the file is downloaded or may be added by the file access platform 107. The information included in the metadata may include e-mail address of the user, a user id and a password, and a subject line of the e-mail thread from which the file originates. The downloaded file may be accessed by a file access application 113 such as DOC READER 805. The title panel 807 shows the name of the file, "Resume.txt." The option window 809 shows options that can be selected within DOC READER 805. The content of the downloaded file "Resume.txt" is displayed in the content window 811. If the downloaded file is modified, a second e-mail including the modified version may be generated and transmitted to the server 801, according to the information in the added metadata. The transmission of the modified version may depend on the synchronization option 813 embedded in the application, DOC READER 805, to enable synchronization between the local device 803 and the server 801. In this example, the synchronization option 813 includes a "Sync New Version" option to transmit a modified version of the file whenever modifications are made to the file in the local device 803. In this example, the "Sync New Version" option has been selected, as indicated by the check mark on the left of the option. The synchronization option 813 also includes a "Sync Upon Save" to transmit a modified version of the file every time the modified version is saved in the DOC READER 805 in the local device 803. Further, the synchronization option 813 includes a "Sync Upon Close" to transmit a modified version of the file when the DOC READER closes the downloaded file (i.e. Resume.txt, in this example). A "Periodically Sync" option may be selected to transmit a modified version of the file periodically (e.g. every ten minutes), if there has been any modification to the file since a previous transmission. There is also an option "Never Sync" to avoid transmitting of a modified version.

Figure 9:
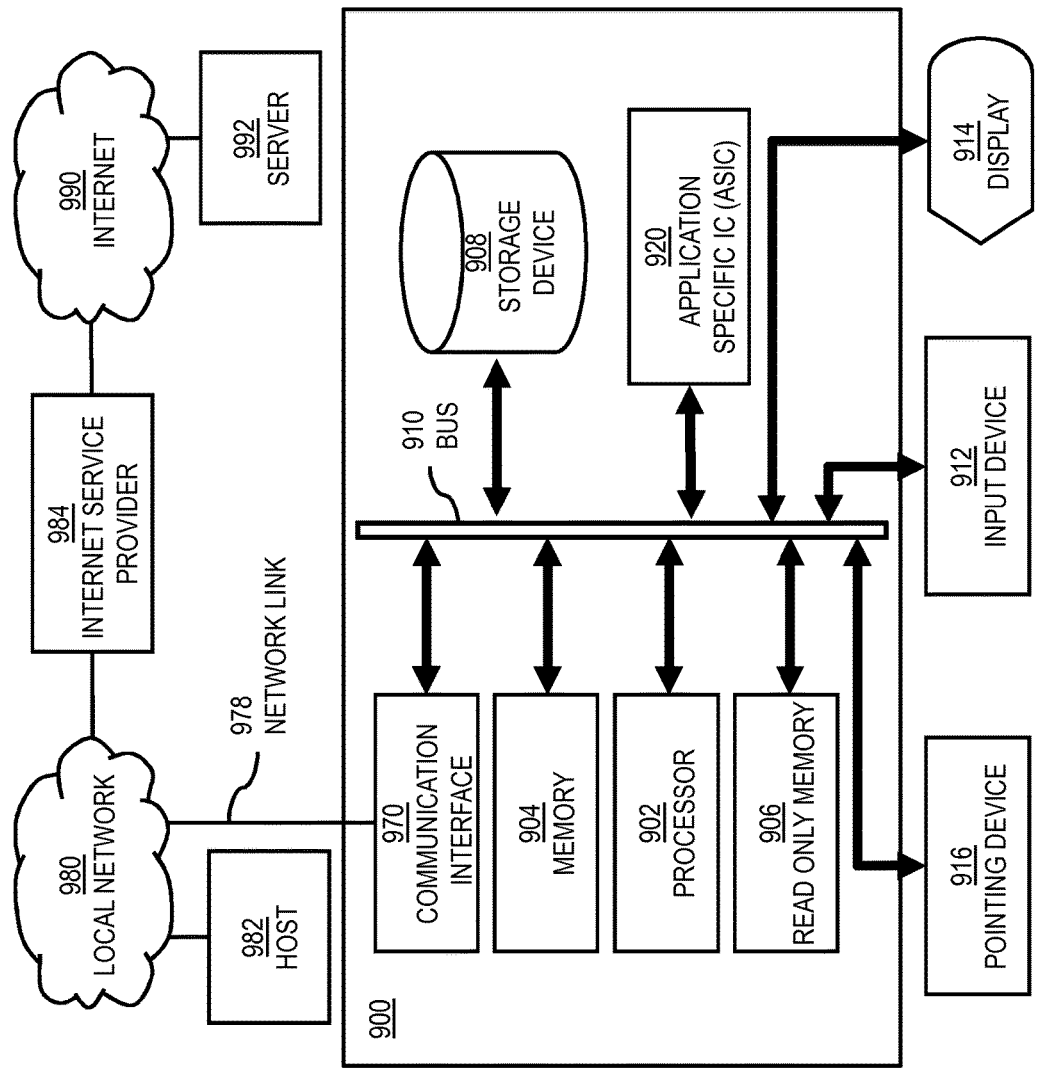
FIG. 9 is a diagram of hardware that can be used to implement an embodiment of the invention.

The processes described herein for synchronizing local files originated from an online account may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below. FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to synchronize local files originated from an online account as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of synchronizing local files originated from an online account.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to synchronizing local files originated from an online account. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for synchronizing local files originated from an online account. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for synchronizing local files originated from an online account, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for synchronizing local files originated from an online account.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
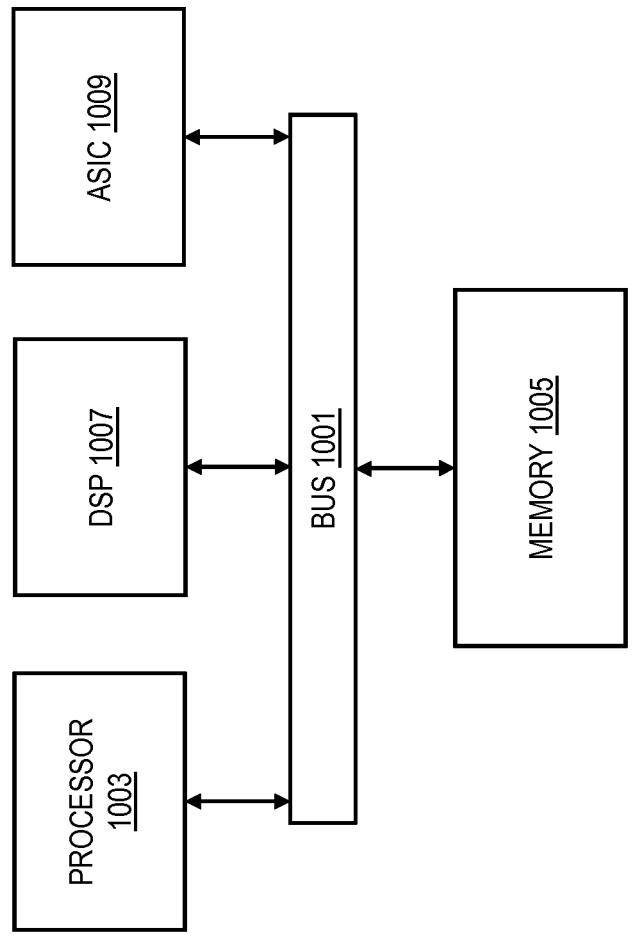
FIG. 10 is a diagram of a chip set that can be used to implement an embodiment of the invention.

FIG. 10 illustrates a chip set or chip 1000 upon which an embodiment of the invention may be implemented. Chip set 1000 is programmed to synchronize local files originated from an online account as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of services. Chip set or chip 1000, or a portion thereof, constitutes a means for performing one or more steps of synchronizing local files originated from an online account.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to synchronize local files originated from an online account. The memory 1005 also stores the data associated with or generated by the execution of the inventive steps.

Figure 11:
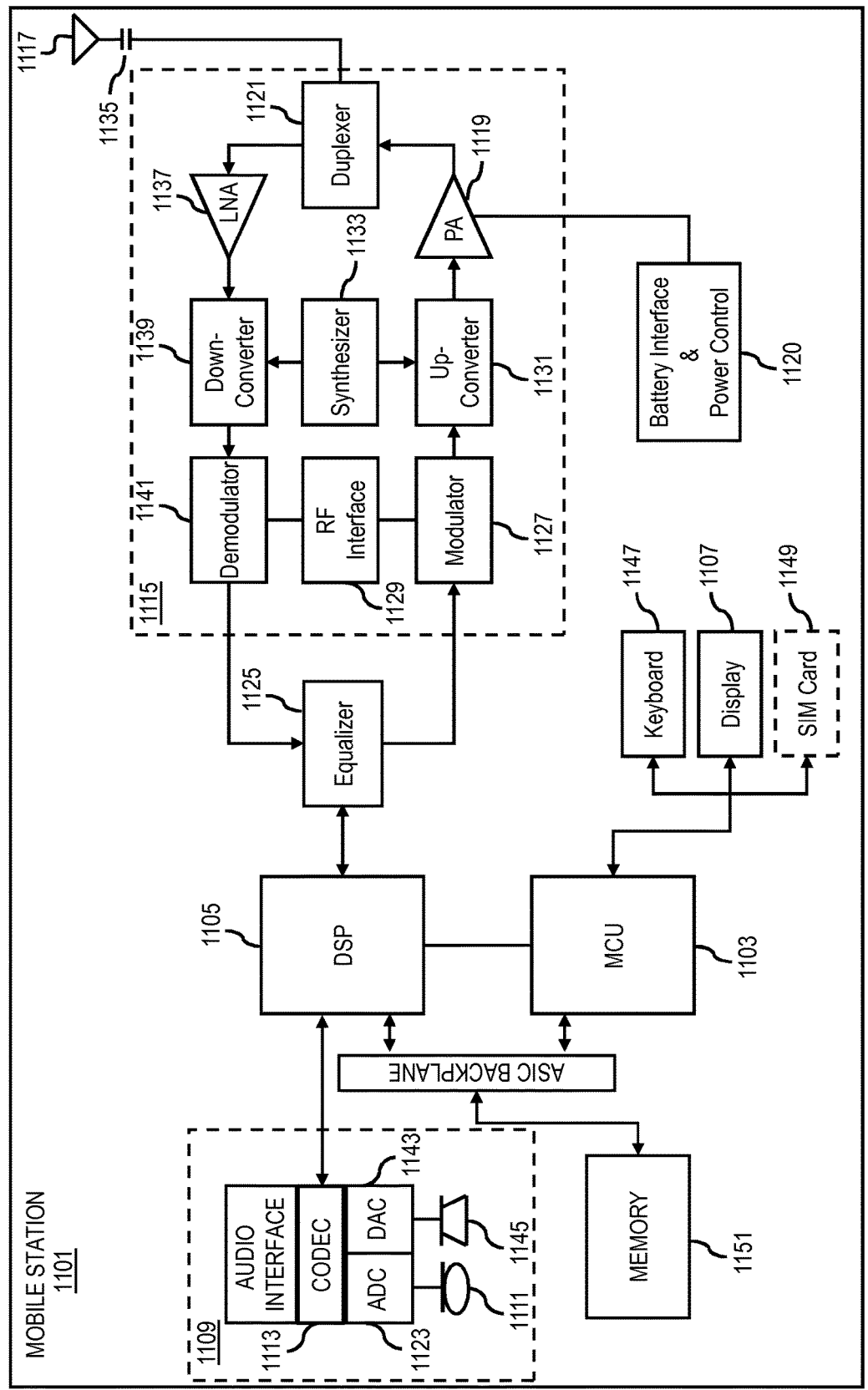
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of synchronizing local files originated from an online account. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of synchronizing local files originated from an online account. The display 11 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to synchronize local files originated from an online account. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:
1. A method comprising:
   causing, at least in part, retrieval of a file associated with a first communication stored in an online account;
   determining whether the file is modified after the retrieval;
   generating a second communication including a modified version of the file based, at least in part, on the determination; and
   causing, at least in part, transmission of the second communication including the modified version to the online account.

2. A method of claim 1, wherein the online account is an online communication account and the file is retrieved from the online communication account, further comprising:
   causing, at least in part, storing of the modified version in the online communication account based, at least in part, on the transmission.

3. A method of claim 2, wherein the retrieval of the file comprises:
   adding metadata to the file including, at least in part, information about the online communication account,
   wherein the transmission of the modified version of the file is based, at least in part, on the metadata.

4. A method of claim 1, further comprising:
   causing, at least in part, presentation of a synchronization option in an application associated with the file; and
   receiving an input for selecting the synchronization option,
   wherein the generating of the second communication and the transmission of the modified version is based, at least in part, on the input.

5. A method of claim 1, further comprising:
   receiving a first input from a first user for specifying an exclusive access to the file;
   designating the file for the exclusive access;
   receiving a second input from a second user for retrieving the file; and
   causing, at least in part, alert of the second user regarding the exclusive access.

6. A method of claim 2, wherein the online communication account is an email account, a forum account, a messaging account, or a combination thereof.

7. A method of claim 2, wherein the online communication account supports threaded communications, and wherein the first communication and the second communication are associated with a common thread.

8. A method of claim 2, further comprising:
identifying other communications in the online communication account associated with one or more other files; and
compiling an index of the file and the other files.

9. An apparatus comprising:
at least one processor; and
at least one memory including computer program code,
the at least one memory and the computer program code configured to, with the at least one processor, cause the apparatus to perform at least the following,
cause, at least in part, retrieval of a file associated with a first communication stored in an online account;
determine whether the file is modified after the retrieval;
generate a second communication including a modified version of the file based, at least in part, on the determination; and
cause, at least in part, transmission of the second communication including the modified version to the online account.

10. An apparatus of claim 9, wherein the online account is an online communication account, the file is retrieved from the online communication account, and the apparatus is further caused, at least in part, to:
cause, at least in part, storing of the modified version in the online communication account based, at least in part, on the transmission.

11. An apparatus of claim 10, wherein the apparatus is further caused, at least in part, to:
add metadata to the file including, at least in part, information about the online communication account,
wherein the transmission of the modified version of the file is based, at least in part, on the metadata.

12. An apparatus of claim 9, wherein the apparatus is further caused, at least in part, to:
cause, at least in part, presentation of a synchronization option in an application associated with the file; and
receive an input for selecting the synchronization option, wherein the generating of the second communication and the transmission of the modified version is based, at least in part, on the input.

13. An apparatus of claim 9, wherein the apparatus is further caused, at least in part, to:
receive a first input from a first user for specifying an exclusive access to the file;
designate the file for the exclusive access;
receive a second input from a second user for retrieving the file; and
cause, at least in part, alert of the second user regarding the exclusive access.

14. An apparatus of claim 10, wherein the online communication account is an email account, a forum account, a messaging account, or a combination thereof.

15. An apparatus of claim 9, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

16. A computer-readable storage medium carrying one or more sequences of one or more instructions which, when executed by one or more processors, cause an apparatus to at least perform the following steps:
causing, at least in part, retrieval of a file associated with a first communication stored in an online account;
determining whether the file is modified after the retrieval;
generating a second communication including a modified version of the file based, at least in part, on the determination; and
causing, at least in part, transmission of the second communication including the modified version to the online account.

17. A computer-readable storage medium of claim 16, wherein the online account is an online communication account, the file is retrieved from the online communication account, the online communication account supports threaded communications, the first communication and the second communication are associated with a common thread, and the apparatus is caused, at least in part, to further perform:
causing, at least in part, storing of the modified version in the online communication account based, at least in part, on the transmission.

18. A computer-readable storage medium of claim 17, wherein the apparatus is caused, at least in part, to further perform:
identifying other communications in the online communication account associated with one or more other files; and
compiling an index of the file and the other files.

19. An apparatus of claim 10, wherein the online communication account supports threaded communications, and wherein the first communication and the second communication are associated with a common thread.

20. An apparatus of claim 10, wherein the apparatus is further caused, at least in part, to:
identify other communications in the online communication account associated with one or more other files; and
compile an index of the file and the other files.

* * * * *